T. K. WORK.
Odometer.
No. 22,912.
Patented Feb. 8, 1859.
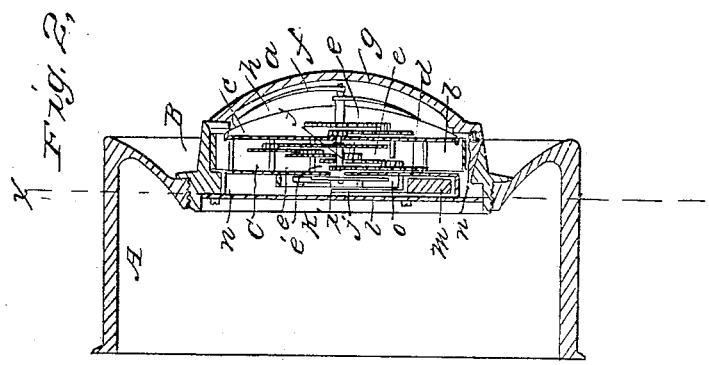
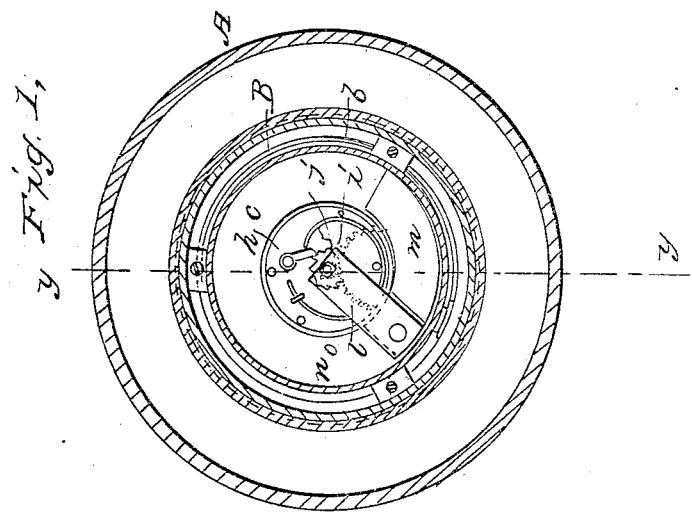
Witnesses:
Charles E. Bulkeley
Geo. S Gitman
Inventor:
Thomas K Work

UNITED STATES PATENT OFFICE.

THOMAS K. WORK, OF HARTFORD, CONNECTICUT.

ODOMETER.

Specification of Letters Patent No. 22,912, dated February 8, 1859.

*To all whom it may concern:*

Be it known that I, THOMAS K. WORK, of Hartford, in the county of Hartford and State of Connecticut, have invented a new and useful Improvement in Odometers; and I do hereby declare that the following is a full, clear, and exact description of the same, reference being had to the annexed drawings, making a part of this specification, in which—

Figure 1, is a section of my invention, taken in the line $x$, $x$, Fig. 2. Fig. 2, is a section of ditto taken in the line $y$, $y$, Fig. 1.

Similar letters of reference indicate corresponding parts in the two figures.

This invention relates to an improvement in that class of odometers in which motion is communicated, from a wheel of the vehicle to which the odometer is applied, to the working parts of the same by a weight.

The object of the within described invention is to obviate the difficulty attending the casual movement of the weight produced by the jolting of the vehicle or wheels in passing over uneven ground, and consequently insure a correct registration of the distance traveled over by the vehicle.

The invention consists in having the weight attached to an arm by a joint, the weight being of segment or curved form and fitted between two curved annular ledges, as hereinafter fully shown and described, so as to effect the desired result.

To enable those skilled in the art to fully understand and construct my invention, I will proceed to describe it.

A, represents an outer hub band constructed of metal and having a chamber B, screwed into its front end, as shown clearly in Fig. 2. This chamber B, contains the odometer, which is constructed as follows.

The outer end of the chamber B, is provided with a cover or flap $a$, which is hinged to the chamber and has a spring $b$, connected with it, said spring being placed within the chamber, and so acting upon the hinge as to keep the cover or flap closed or preventing it from casually opening. Within the chamber B, a frame formed of two circular plates $c$, $c$, are attached, said plates being secured at a proper distance apart by bars or rods $d$, $d$, as shown clearly in Fig. 2. Within the frame or between the two plates $c$, $c$, and at the outerside of the outermost plate, a system of wheels, similar to a watch movement, is placed, and these wheels are connected with a pair of hands or indexes $f$, $g$, which traverse over a dial $h$, attached to the outer side of the outermost plate $a$, the dial being covered by the cover or flap $a$. The index $f$, moves with a greater speed than $g$, as ten to one, the index $f$, indicating units, and the index $g$ tens.

The wheels $e$, are set in motion by a pinion $e'$, which has a hollow axis or shaft $i$, that is placed loosely on a stationary shaft $j$. The hollow shaft extends through the back plate $a$, and has a ratchet $j'$, on its back end, into which ratchet a pawl $k$, catches.

To the back end of the hollow shaft $i$, an arm $l$, is attached, said arm having a curved or segment weight $m$, pivoted to its lower end. The form of this weight is shown clearly in Fig. 1, and it is fitted between two annular and concentric ledges $n$, $o$, which are attached to the back side of the plate $a$, the space between the ledges being a trifle wider than the weight, in order to permit of the free movement of the latter.

The operation is as follows: The implement, as shown in the drawing, is intended for the wheel at the right hand of the driver, the band A, being attached to the front end of the hub, as usual. As the vehicle is drawn along the arm $l$, and pinion $e'$, are kept stationary on account of the weight $m$, it being recollected that the pinion $e'$, is placed loosely on the shaft $j$, and the weight $m$, fitted loosely between the ledges $n$, $o$. The other wheels $e$, of course rotate with the band A, and as the wheel $e'$, gears into one of said wheels $e$, motion is communicated to the latter. The revolutions of the band A, and carriage wheels, therefore, will be noted by the indexes $f$, $g$, on the dial $h$, and the exact distance traveled over made known. In case the vehicle is backed the indexes $f$, $g$, are not moved, as the pawl $k$, catches into the ratchet $j'$, and prevents motion being communicated to the wheels $e$. The indexes therefore will not be affected by any backward movement of the vehicle. In case the vehicle is jolted in passing over uneven ground and the wheel to which the odometer is attached suddenly raised, the weight $m$ will be prevented from rising any great distance between the ledges $n$, $o$, as its end will, by centrifugal force, be thrown outward, and the weight will consequently bind between the ledges $n$, $o$. The weight $m$, therefore, when thrown quickly upward and stopped, turns with the band A, until it reaches its proper position, and the increased speed with which the indexes were operated by the sudden upward movement of the weight will be compensated for by its inaction as it is brought to its original position by the forward movement of the wheel, it being understood that when the weight moves with the band the indexes are stationary, so far as their receding movement is concerned. By this invention, therefore, any movement of the weight consequent on the jolting of the vehicle is compensated for, and the correct distance traveled over will be noted by the indexes on the dial $h$.

I am aware that weights have been previously used to actuate or communicate motion from carriage wheels to the working parts of odometers, but I am not aware that any provision has hitherto been made for preventing inaccuracies of the recording mechanism due to the casual movement of the weights. I, therefore, do not claim, broadly, the employment or use of a weight for the purpose specified, but

Having thus described my invention, what I claim as new and desire to secure by Letters Patent, is—

The curved or segment weight $m$, pivoted to the arm $l$, which is attached to the pinion $e'$, and fitted between the annular ledges $n$, $o$, substantially as and for the purpose set forth.

THOMAS K. WORK.

Witnesses:
CHARLES E. BULKELEY,
GEO. S. GILMAN.